(12) United States Patent
Doorn

(10) Patent No.: US 8,507,566 B2
(45) Date of Patent: *Aug. 13, 2013

(54) PROCESS FOR THE PREPARATION OF SYNTHESIS GAS

(75) Inventor: Siebolt Doorn, Spijk (NL)

(73) Assignee: Gelato Corporation N.V., Curacao (AN)

( * ) Notice: Subject to any disclaimer, the term of this patent is extended or adjusted under 35 U.S.C. 154(b) by 813 days.

This patent is subject to a terminal disclaimer.

(21) Appl. No.: 12/310,488

(22) PCT Filed: Sep. 7, 2007

(86) PCT No.: PCT/EP2007/007798
§ 371 (c)(1),
(2), (4) Date: Mar. 23, 2010

(87) PCT Pub. No.: WO2008/028670
PCT Pub. Date: Mar. 13, 2008

(65) Prior Publication Data
US 2010/0185023 A1    Jul. 22, 2010

(30) Foreign Application Priority Data

Sep. 8, 2006 (EP) .................................... 06120334
May 2, 2007 (EP) .................................... 07008814

(51) Int. Cl.
*C01B 3/22* (2006.01)
*C01B 3/24* (2006.01)
*C01B 3/26* (2006.01)
*C07C 27/06* (2006.01)

(52) U.S. Cl.
USPC .......................................... 518/704; 252/373

(58) Field of Classification Search
USPC ................. 252/373; 518/704; 423/650–654
See application file for complete search history.

(56) References Cited

U.S. PATENT DOCUMENTS

| 1,627,040 | A | | 5/1927 | Lawrie | |
|---|---|---|---|---|---|
| 1,881,718 | A | | 10/1932 | Lawrie | |
| 1,936,497 | A | | 11/1933 | Carothers et al. | |
| 4,913,842 | A | * | 4/1990 | Yoneoka et al. | 252/373 |
| 4,927,857 | A | | 5/1990 | McShea, III et al. | |
| 5,817,906 | A | * | 10/1998 | Marker et al. | 585/640 |
| 7,618,612 | B2 | * | 11/2009 | Cortright et al. | 423/651 |
| 8,372,310 | B2 | * | 2/2013 | Doorn | 252/373 |
| 2004/0022723 | A1 | | 2/2004 | Cortright et al. | |
| 2006/0182680 | A1 | * | 8/2006 | Keefer et al. | 423/651 |

FOREIGN PATENT DOCUMENTS

| EP | 0 926 096 A1 | 6/1999 |
|---|---|---|
| EP | 0 978 314 A1 | 2/2000 |
| EP | 1 391 421 A1 | 2/2004 |
| GB | 1006745 | 5/1964 |
| GB | 2 274 284 A | 7/1994 |

OTHER PUBLICATIONS

Chornet et al., "Harnessing Hydrogen," *Nature*, vol. 418, Aug. 2002, pp. 928-929.
Valliyappan, "Hydrogen or Syn Gas Production from Glycerol Using Pyrolysis and Steam Gasification Processes," University of Saskatchewan, Saskatoon, Dec. 2004.
Xu et al., "Carbon-Catalyzed Gasification of Organic Feedstocks in Supercritical Water," *Industrial & Engineering Chemistry*, vol. 35, No. 8, Aug. 1996, pp. 2522-2530.
Qingquan et al., "Development and Prospect of Synthesis Gas Chemistry," No. 2, pp. 17-23. 1981.
Chinese Office Action issued in Chinese Patent Application No. 200780033038.7 dated Sep. 21, 2010 (with translation).

* cited by examiner

*Primary Examiner* — Wayne Langel
(74) *Attorney, Agent, or Firm* — Oliff & Berridge, PLC

(57) ABSTRACT

Process for the production of synthesis gas which involves the steps of: a) preparing a vapor phase mixture comprising steam and at least one hydrocarbon or oxygenated hydrocarbon with an atmospheric boiling point in the range of −50 to 370° C., said vapor phase mixture having a $H_2O/C$ molar ratio at least 2, and b) catalytically or non-catalytically converting the vapor phase mixture into synthesis gas, which process is characterized in that the oxygen is only added in bonded form.

13 Claims, No Drawings

PROCESS FOR THE PREPARATION OF SYNTHESIS GAS

The present invention relates to the production of synthesis gas from an (oxygenated) hydrocarbon with an atmospheric boiling point in the range of −50 to 370° C. The invention also relates to a process for the production of methanol from the so-produced synthesis gas and to a process for preparing a vapour phase mixture of steam and (oxygenated) hydrocarbon that can be used to produce the synthesis gas.

The production of biodiesel is steadily increasing. Biodiesel is generally made from vegetable and animal oils and fats, such as rape seed oil, sunflower oil, palm oil (kernel and pit), coconut oil, soybean oil, corn, cooking oil, trap grease, and (in)edible tallow. With biodiesel production, large amounts of glycerol are formed. It is therefore important to find useful applications for glycerol. One such application is its use as feedstock for the production of synthesis gas.

One of the methods presently employed for the production of synthesis gas is steam reforming of natural gas (methane). This method involves purification of the gas by hydrodesulfurization, mixing the purified gas with steam, heating the resulting mixture in a convection section, and leading the resulting mixture over a catalyst bed to produce synthesis gas.

One of the chemicals that can be produced from synthesis gas is methanol. In a methanol production plant, synthesis gas is produced, the produced gas is compressed, and then passed through a converter in order to convert it to methanol.

The use of glycerol for the production of synthesis gas is known from the prior art (see: T. Valliyappan, "Hydrogen or Syn Gas Production from Glycerol Using Pyrolysis and Steam Gasification Processes", Thesis, University of Saskatchewan, December 2004). In the known processes, liquid glycerol droplets—in a stream of inert gas or steam—are introduced into a catalyst bed. Unfortunately, this leads to significant carbon deposition on the catalyst, resulting in catalyst deactivation.

According to U.S. Pat. No. 4,927,857 synthesis gas can be obtained from a hydrocarbonaceous feed including hydrocarbon feeds of all types, as well as alcohols such as ethanol, methanol and mixtures thereof.

The inlet stream that comprises the hydrocarbonaceous feed, $H_2O$ and oxygen is preheated to initiate the catalytic oxidation of the feed.

The ratio of $H_2O$ to C ranges from 0.5 to 3 and the ratio of $O_2$ to C from 0.35 to 0.65

EP 0 926 096 also discloses the preparation of synthesis gas from hydrocarbon feedstocks in a step production by using high temperature mixed conducting membrane reactors by the controlled reaction of hydrocarbons with oxygen, wherein the oxygen is provided in situ by permeation from an oxygen-containing gas, such as air, through the mixed conducting membrane.

The ratio of $H_2O$ to C ranges from 0.3 to about 5.

The object of the present invention is to provide a process for the production of synthesis gas from (oxygenated) hydrocarbons, such as glycerol, wherein carbon deposition on the catalyst is diminished or even absent The process according to the invention involves the steps of:
  a) preparing a vapour phase mixture comprising steam and at least one hydrocarbon or oxygenated hydrocarbon with an atmospheric boiling point in the range of −50 to 370° C., said vapour phase mixture having a $H_2O/C$ molar ratio of at least 2, and
  b) catalytically or non-catalytically converting the vapour phase mixture into synthesis gas, characterized in that the oxygen is only added in bonded form.

So, in the process of the present invention, the (oxygenated) hydrocarbon, e.g. glycerol, is not introduced into the catalyst bed as a liquid. Instead, it is fed to the catalyst bed as a vapour, together with the necessary amount of steam. It has surprisingly been found that this results in diminished carbon deposition on the catalyst.

Further, there is no addition of oxygen as described in the prior art, instead the oxygen is present only in bonded form.

U.S. Pat. No. 4,927,857, which pertains to the production of a new catalyst, applies oxygen ($O_2$) for the conversion into synthesis gas EP 0 926 096 describes a membrane reactor for producing synthesis gas, again with the use of oxygen ($O_2$).

Surprisingly, one can say, elemental oxygen is absent in the process according to the invention. Oxygen is only supplied by the water (steam) molecule or is present in the oxygenated hydrocarbons, such as in the glycerol.

Direct conversion of glycerol easily forms carbon deposits. In the present invention carbon deposits are avoided by the right amount of steam. The aid of oxygen gas is not needed.

The vapour phase mixture comprises steam and at least one hydrocarbon or oxygenated hydrocarbon. This hydrocarbon or oxygenated hydrocarbon should have an atmospheric boiling point (i.e. the boiling point at atmospheric pressure) in the range of −50 to 370° C., more preferably 0 to 370° C., even more preferably 30 to 370° C., and most preferably 50 to 370° C.

Examples of suitable hydrocarbons are alkanes with a boiling point within the mentioned range. Preferred alkanes are alkanes with 3 to 7 carbon atoms, such as propane, butane, pentane, hexane, and heptane.

Examples of suitable oxygenated hydrocarbons are alcohols, including mono-alcohols, diols, and triols, such as ethanol, propanol, iso-propanol, glycerol, and glycols.

Preferably, an oxygenated hydrocarbon is used. More preferably, the oxygenated hydrocarbon is glycerol.

The $H_2O/C$ molar ratio in said vapour phase mixture should be at least 2, preferably at least 2.5. The $H_2O/C$ molar ratio preferably is not higher than 5, more preferably not higher than 4, and most preferably not higher than 3.2.

Thus, when the right steam to carbon ratio is used, carbon deposition can be suppressed or even avoided and more importantly also oxygen gas can be excluded in the process. Indeed the oxygen can be supplied solely from an alcohol molecule and/or from the water in the process.

The vapour phase mixture can be prepared by contacting steam with the (oxygenated) hydrocarbon in a gas-liquid contacting device, such as a distillation column or a scrubber.

A suitable distillation column requires only a few plates. At the top of the column, concentrated (oxygenated) hydrocarbon is introduced. At the bottom, steam is introduced. The vapour phase mixture leaves the distillation column at the top.

The $H_2O/C$ molar ratio of the resulting vapour phase mixture will depend on (i) the temperature and pressure of the steam that is introduced into the gas-liquid contacting device and (ii) the distillation equilibrium between steam and the (oxygenated) hydrocarbon at that temperature and pressure. In other words, the desired temperature and pressure of the steam will depend on the type of (oxygenated) hydrocarbon used and should be chosen such that—given the distillation equilibrium—a $H_2O/C$ molar ratio of at least 2 is obtained.

When glycerol is used as the oxygenated hydrocarbon, the steam preferably has a pressure of 10-30 bar, more preferably 15-25 bar, and most preferably about 20 bar. The temperature of the steam preferably is 270-380° C., more preferably 310-360° C., and most preferably about 340° C.

At the bottom of the distillation column, a liquid water/(oxygenated) hydrocarbon mixture can be removed. The (oxygenated) hydrocarbon can be isolated from this mixture—for instance by flashing at reduced pressure—and recycled to the top of the distillation column.

The synthesis gas production according to the invention thus can be executed over a packing-material, i.e. non-catalytically or by using a catalyst.

Preferably, the vapour phase mixture is catalytically converted into synthesis gas. In a preferred embodiment, this is done by feeding the vapour phase mixture to the convection section of a steam reformer. In this convection section, the vapour phase mixture can be mixed with natural gas and additional steam. This makes the process very flexible, since it allows the use of both natural gas and glycerol, depending on their availability. Furthermore, it allows coupling of the vapour phase mixture preparation unit (i.e. the gas-liquid contacting device) to the convection section of an existing steam reformer.

The vapour phase mixture can be mixed with natural gas and steam in any ratio, as long as the resulting mixture of (oxygenated) hydrocarbon, steam, and natural gas has a $H_2O/C$ molar ratio of least 2.

Preferably, the mixture leaving the convection section is composed of 10-100 vol % of the vapour phase mixture. More preferably, the mixture leaving the convection section contains methane and glycerol in a molar ratio methane:glycerol in the range 1:1 to 3:1, more preferably about 2:1.

The mixture leaving the convection section proceeds through the steam reformer in conventional ways and synthesis gas is produced in a conventional steam reforming catalyst bed. Examples of steam reforming catalysts are supported Ni, Co, Pt, Pd, Ir, Rh, and Ru catalysts. Considering the cost per unit of activity, nickel catalysts are generally preferred. Such nickel catalysts are normally added to the reformer in the nickel oxide form and reduced to the metallic state immediately before use. Different carrier materials can be used to support the metal, such as alumina, magnesia, silica, calcium aluminate, or combinations thereof. The catalyst may be in the form of, e.g., pellets, wheels, lumps, or rings. The catalyst can be present in a fixed bed or a fluid bed or supported on a ceramic monolyth.

The catalyst bed generally operates at a temperature in the range of 300 to 1,050° C., more preferably 300 to 950° C., and most preferably 350 to 850° C.

The synthesis gas produced can be used to synthesize various chemicals, such as methanol, acetic acid, methyl formate, ethanol, propanol, isobutanol, ethylene glycol, dimethyl ether, and n-butanol.

In particular, the present invention also relates to a process for the production of methanol which involves the steps of (i) preparing synthesis gas according to the present invention, followed by (ii) converting the synthesis gas to methanol. According to this process, synthesis gas is produced as described above and the produced gas is then compressed and converted to methanol using conventional techniques.

The invention claimed is:

1. Process for the production of synthesis gas, which comprises:
   a) preparing in a gas-liquid contacting device a vapor phase mixture comprising steam and at least one hydrocarbon or oxygenated hydrocarbon with an atmospheric boiling point in the range of −50 to 370° C., said vapor phase mixture having a $H_2O/C$ molar ratio of at least 2, wherein the vapor phase mixture does not contain elemental oxygen, and oxygen in the vapor phase mixture is only supplied by water of the steam or is present in the oxygenated hydrocarbon, so that oxygen is only added in bonded form, and
   b) catalytically or non-catalytically converting the vapor phase mixture into synthesis gas.

2. Process according to claim 1 wherein the at least one hydrocarbon or oxygenated hydrocarbon is an oxygenated hydrocarbon.

3. Process according to claim 2 wherein the oxygenated hydrocarbon is glycerol.

4. Process according to claim 1 wherein the $H_2O/C$ molar ratio of the vapor phase mixture ranges from 2.5 to 4.

5. Process according to claim 1 wherein the vapor phase mixture is mixed with natural gas prior to catalytically converting the vapor phase mixture to synthesis gas.

6. Process according to claim 1 wherein the vapor phase mixture is prepared in a distillation column by feeding the at least one hydrocarbon or oxygenated hydrocarbon at a top of the distillation column and feeding steam at a bottom of the distillation column.

7. Process for the production of methanol which comprises (i) preparing the synthesis gas according to claim 1, followed by (ii) converting the synthesis gas to methanol.

8. Process according to claim 1, wherein the preparing of the vapor phase mixture is completed prior to the vapor phase mixture contacting any catalyst.

9. Process for the production of synthesis gas, comprising
   preparing a vapor phase mixture with a $H_2O/C$ molar ratio of at least 2 which comprises steam and at least one hydrocarbon or oxygenated hydrocarbon with an atmospheric boiling point in the range of −50 to 370° C., by introducing the steam at a bottom of a distillation column and introducing the at least one hydrocarbon or oxygenated hydrocarbon is at a top of said distillation column, and
   feeding the vapor phase mixture exiting the top of the distillation column to a reformer to catalytically or non-catalytically convert the vapor phase mixture into synthesis gas.

10. Process according to claim 9 wherein the at least one hydrocarbon or oxygenated hydrocarbon is an oxygenated hydrocarbon, which is glycerol and the steam introduced into the distillation column has a pressure of 10-30 bars and a temperature of 270-380° C.

11. Process according to claim 9 wherein the $H_2O/C$ molar ratio of the vapor vapour phase mixture ranges from 2.5 to 4.

12. Process according to claim 9, wherein a liquid comprised of water and hydrocarbon and/or oxygenated hydrocarbon is removed from the bottom of the distillation column, the hydrocarbon and/or oxygenated hydrocarbon is isolated from the mixture, and the isolated hydrocarbon and/or oxygenated hydrocarbon is recycled to the top of the distillation column.

13. Process for the production of methanol which comprises (i) preparing the synthesis gas according to claim 9, followed by (ii) converting the synthesis gas to methanol.

* * * * *